(12) United States Patent
Matsumoto et al.

(10) Patent No.: US 10,394,367 B2
(45) Date of Patent: Aug. 27, 2019

(54) LIQUID CRYSTAL DISPLAY DEVICE

(71) Applicant: Japan Display Inc., Tokyo (JP)

(72) Inventors: Shuuichirou Matsumoto, Mobara (JP); Yoshinori Aoki, Mobara (JP)

(73) Assignee: Japan Display Inc., Tokyo (JP)

(*) Notice: Subject to any disclaimer, the term of this patent is extended or adjusted under 35 U.S.C. 154(b) by 143 days.

(21) Appl. No.: 15/162,050

(22) Filed: May 23, 2016

(65) Prior Publication Data
US 2016/0266714 A1    Sep. 15, 2016

Related U.S. Application Data

(63) Continuation of application No. 13/912,233, filed on Jun. 7, 2013, now Pat. No. 9,378,699.

(30) Foreign Application Priority Data

Jun. 8, 2012  (JP) .................. 2012-130681

(51) Int. Cl.
*G06F 3/041* (2006.01)
*G09G 3/36* (2006.01)
(Continued)

(52) U.S. Cl.
CPC .......... *G06F 3/0416* (2013.01); *G02F 1/1368* (2013.01); *G02F 1/13338* (2013.01);
(Continued)

(58) Field of Classification Search
CPC .................................................. G06F 3/0416
See application file for complete search history.

(56) References Cited

U.S. PATENT DOCUMENTS 5,952,990 A * 9/1999 Inoue .................. G09G 3/3629
                                              345/214
8,508,495 B2 * 8/2013 Hotelling ............ G02F 1/13338
                                              345/174
(Continued)

FOREIGN PATENT DOCUMENTS

CN        1818842 A     8/2006
CN      101893955 A    11/2010
(Continued)

OTHER PUBLICATIONS

Japanese Office Action dated Jun. 28, 2016, for corresponding JP application No. 2012-130681 with partial English Translation.
(Continued)

*Primary Examiner* — Kent W Chang
*Assistant Examiner* — Scott Au
(74) *Attorney, Agent, or Firm* — Michael Best & Friedrich LLP

(57) ABSTRACT

In a liquid crystal display device with a touch panel function, a second substrate has detection electrodes of a touch panel, each pixel has a pixel electrode and a counter electrode, the counter electrode is divided into a plurality of blocks, and the counter electrodes of the respective divided blocks are shared to the respective pixels of a plurality of display lines side by side, the counter electrodes of the respective divided blocks is also used as scanning electrodes of the touch panel, and a driver circuit is provided to apply a counter voltage and a touch panel scanning voltage to the counter electrodes of the respective divided blocks, and the driver circuit can adjust a supply start timing of the touch panel scanning voltage to be applied to the counter electrodes of the respective divided blocks.

12 Claims, 19 Drawing Sheets

(51) Int. Cl.
*G06F 3/044* (2006.01)
*G02F 1/1333* (2006.01)
*G02F 1/1343* (2006.01)
*G02F 1/1362* (2006.01)
*G02F 1/1368* (2006.01)

(52) U.S. Cl.
CPC .. *G02F 1/134336* (2013.01); *G02F 1/136286* (2013.01); *G06F 3/044* (2013.01); *G06F 3/0412* (2013.01); *G09G 3/3696* (2013.01)

(56) References Cited

U.S. PATENT DOCUMENTS

| | | | |
|---|---|---|---|
| 2004/0217945 A1* | 11/2004 | Miyamoto | G06F 3/0412 345/173 |
| 2008/0198140 A1* | 8/2008 | Kinoshita | G06F 3/0412 345/173 |
| 2009/0153460 A1 | 6/2009 | Takeda | |
| 2009/0184897 A1 | 7/2009 | Miyamoto | |
| 2009/0256818 A1 | 10/2009 | Noguchi et al. | |
| 2010/0259503 A1* | 10/2010 | Yanase | G06F 3/0416 345/174 |
| 2010/0295824 A1* | 11/2010 | Noguchi | G02F 1/13338 345/175 |
| 2011/0157064 A1 | 6/2011 | Imai | |
| 2012/0262387 A1* | 10/2012 | Mizuhashi | G06F 3/0412 345/173 |
| 2012/0287081 A1 | 11/2012 | Akai et al. | |
| 2015/0084912 A1* | 3/2015 | Seo | G06F 3/0412 345/174 |

FOREIGN PATENT DOCUMENTS

| | | |
|---|---|---|
| CN | 102132238 A | 7/2011 |
| JP | 2006-189859 A | 7/2006 |
| JP | 2006-190287 A | 7/2006 |
| JP | 2009-258182 A | 11/2009 |
| JP | 2011-233019 A | 11/2011 |
| JP | 2012-42861 A | 3/2012 |
| KR | 10-2004-0022243 A | 3/2004 |
| TW | 200706971 A | 2/2007 |
| TW | 201203061 A | 1/2012 |
| WO | 2010/098199 A | 9/2010 |

OTHER PUBLICATIONS

Korean Office Action dated Mar. 31, 2014, for corresponding Korean Patent Application No. 10-2013-65455.
Office Action dated Jul. 1, 2015 for a corresponding Chinese Patent Application No. 201310232514.5.
Office Action dated May 11, 2015 regarding corresponding Taiwanese Patent Application No. 102120462.
Japanese Office Action dated Apr. 5, 2016 for corresponding Japanese Patent Application No. 2012-130681.

* cited by examiner

FIG.15A

| DELAY[5:0] | UNIT[us] |
|---|---|
| 6'h00 | 0.0 |
| 6'h01 | 0.5 |
| 6'h02 | 1.0 |
| 6'h03 | 1.5 |
| 6'h04 | 2.0 |
| 6'h05 | 2.5 |
| 6'h06 | 3.0 |
| 6'h07 | 3.5 |
| 6'h08 | 4.0 |
| 6'h09 | 4.5 |
| 6'h0A | 5.0 |
| 6'h0B | 5.5 |
| 6'h0C | 6.0 |
| 6'h0D | 6.5 |
| 6'h0E | 7.0 |
| 6'h0F | 7.5 |

| DELAY[5:0] | UNIT[us] |
|---|---|
| 6'h10 | 8.0 |
| 6'h11 | 8.5 |
| 6'h12 | 9.0 |
| 6'h13 | 9.5 |
| 6'h14 | 10.0 |
| 6'h15 | 10.5 |
| 6'h16 | 11.0 |
| 6'h17 | 11.5 |
| 6'h18 | 12.0 |
| ... | ... |
| 6'h3A | 29.0 |
| 6'h3B | 29.5 |
| 6'h3C | 30.0 |
| 6'h3D | 30.5 |
| 6'h3E | 31.0 |
| 6'h3F | 31.5 |

FIG.15B

| WIDTH[5:0] | UNIT[us] |
|---|---|
| 6'h00 | 0.0 |
| 6'h01 | 0.5 |
| 6'h02 | 1.0 |
| 6'h03 | 1.5 |
| 6'h04 | 2.0 |
| 6'h05 | 2.5 |
| 6'h06 | 3.0 |
| 6'h07 | 3.5 |
| 6'h08 | 4.0 |
| 6'h09 | 4.5 |
| 6'h0A | 5.0 |
| 6'h0B | 5.5 |
| 6'h0C | 6.0 |
| 6'h0D | 6.5 |
| 6'h0E | 7.0 |
| 6'h0F | 7.5 |

| WIDTH[5:0] | UNIT[us] |
|---|---|
| 6'h10 | 8.0 |
| 6'h11 | 8.5 |
| 6'h12 | 9.0 |
| 6'h13 | 9.5 |
| 6'h14 | 10.0 |
| 6'h15 | 10.5 |
| 6'h16 | 11.0 |
| 6'h17 | 11.5 |
| 6'h18 | 12.0 |
| ... | ... |
| 6'h3A | 29.0 |
| 6'h3B | 29.5 |
| 6'h3C | 30.0 |
| 6'h3D | 30.5 |
| 6'h3E | 31.0 |
| 6'h3F | 31.5 |

FIG.19A

| SCANH[3:0] | TOUCH PANEL SCANNING VOLTAGE Vstc[V] |
|---|---|
| 4'h00 | 5.0 |
| 4'h01 | 4.8 |
| 4'h02 | 4.6 |
| 4'h03 | 4.4 |
| 4'h04 | 4.2 |
| 4'h05 | 4.0 |
| 4'h06 | 3.8 |
| 4'h07 | 3.6 |
| 4'h08 | 3.4 |
| 4'h09 | 3.2 |
| 4'h0A | 3.0 |
| 4'h0B | 2.8 |
| 4'h0C | 2.6 |
| 4'h0D | 2.4 |
| 4'h0E | 2.2 |
| 4'h0F | 2.0 |

FIG.19B

| AMP[3:0] | VOLTAGE AMPLITUDE[V] |
|---|---|
| 4'h00 | 6.0 |
| 4'h01 | 5.8 |
| 4'h02 | 5.6 |
| 4'h03 | 5.4 |
| 4'h04 | 5.2 |
| 4'h05 | 5.0 |
| 4'h06 | 4.8 |
| 4'h07 | 4.6 |
| 4'h08 | 4.4 |
| 4'h09 | 4.2 |
| 4'h0A | 4.0 |
| 4'h0B | 3.8 |
| 4'h0C | 3.6 |
| 4'h0D | 3.4 |
| 4'h0E | 3.2 |
| 4'h0F | 3.0 |

FIG.19C

| VCOM[7:0] | COMMON VOLTAGE[V] | TOUCH PANEL SCANNING VOLTAGE |
|---|---|---|
| 8'h00 | 0 | Vstc=5V |
| 8'h01 | -0.025 | Vstc=5V |
| 8'h02 | -0.050 | Vstc=5V |
| 8'h03 | -0.075 | Vstc=5V |
| ... | ... | Vstc=5V |
| 8'h26 | -0.950 | Vstc=5V |
| 8'h27 | -0.975 | Vstc=5V |
| 8'h28 | -1.000 | Vstc=5V |
| 8'h29 | -1.025 | Vstc=4.8V |
| 8'h2A | -1.050 | Vstc=4.8V |
| 8'h2B | -1.075 | Vstc=4.8V |
| 8'h2C | -1.100 | Vstc=4.8V |
| 8'h2D | -1.125 | Vstc=4.8V |
| 8'h2E | -1.150 | Vstc=4.8V |
| 8'h2F | -1.175 | Vstc=4.8V |
| 8'h30 | -1.200 | Vstc=4.8V |
| 8'h31 | -1.225 | Vstc=4.6V |
| 8'h32 | -1.250 | Vstc=4.6V |
| 8'h33 | -1.275 | Vstc=4.6V |
| 8'h34 | -1.300 | Vstc=4.6V |
| 8'h35 | -1.325 | Vstc=4.6V |
| 8'h36 | -1.350 | Vstc=4.6V |
| 8'h37 | -1.375 | Vstc=4.6V |
| 8'h38 | -1.400 | Vstc=4.6V |
| 8'h39 | -1.425 | Vstc=4.4V |
| 8'h3A | -1.450 | Vstc=4.4V |
| 8'h3B | -1.475 | Vstc=4.4V |
| 8'h3C | -1.500 | Vstc=4.4V |
| 8'h3D | -1.525 | Vstc=4.4V |
| 8'h3E | -1.550 | Vstc=4.4V |
| 8'h3F | -1.575 | Vstc=4.4V |
| 8'h40 | -1.600 | Vstc=4.4V |

The rest is omitted

LIQUID CRYSTAL DISPLAY DEVICE

CROSS-REFERENCE TO RELATED APPLICATION

This application is a continuation of U.S. patent application Ser. No. 13/912,233, filed on Jun. 7, 2013. Further, this application claims priority from Japanese application JP2012-130681, filed on Jun. 8, 2012, the entire contents of which are hereby incorporated by reference into this application.

BACKGROUND OF THE INVENTION

1. Field of the Invention

The present invention relates to a liquid crystal display device, and more particularly to a technique effectively applied to an in-cell type liquid crystal display device which incorporates a touch panel.

2. Description of the Related Art

Display devices having a device (hereinafter also called "touch sensor" or "touch panel") for inputting information by conducting touch operation (touch pressing operation, hereinafter simply called "touch") on a display screen with a user's finger or a pen are used in mobile electronic devices such as a PDA or a mobile terminal, a variety of home electric appliances, and automated teller machines.

As the above touch panel, a capacitance type touch panel that detects a change in the capacitance of a touched portion has been known.

As the capacitance type touch panel, there has been known a liquid crystal display device having a so-called "in-cell touch panel" in which a touch panel function is incorporated into a liquid crystal display panel as disclosed in JP 2009-258182 A.

In the in-cell touch panel, a scanning electrode of the touch panel is configured by dividing a counter electrode (also called "common electrode") formed on a first substrate (so-called "TFT substrate") configuring the liquid crystal display panel.

SUMMARY OF THE INVENTION

In the in-cell touch panel, noise of gate scan interferes with a scanning signal (so-called "pulse voltage") due to a parasitic capacitance between the gate lines for display and the scanning electrode (so-called "counter electrode") to degrade a detection sensitivity.

Also, a voltage on a high side of a touch panel scanning voltage is a scanning voltage, a voltage on a low side thereof is a common voltage, and a common voltage is different for each of the liquid crystal display panels. For that reason, an amplitude of the touch panel scanning voltage is different for each of the liquid crystal display panels, and the touch detection sensitivity of each liquid crystal display panel become uneven.

The present invention has been made to solve the problem with the related art, and therefore an object of the present invention is to provide a technique in which the reduction of the detection sensitivity because of the noise of gate scan can be prevented in a liquid crystal display device with a touch panel function.

Also, another object of the present invention is to provide a technique in which a variability of the touch detection sensitivity for each of the liquid crystal display devices can be reduced, in a liquid crystal display device with a touch panel function.

The above and other objects and novel features of the present invention will become apparent from the description of the present specification and the attached drawings.

The typical features of the invention disclosed in the present application will be described in brief as follows.

(1) There is provided a liquid crystal display device including a liquid crystal display panel having a first substrate, a second substrate, and liquid crystal held between the first substrate and the second substrate, and having a plurality of pixels arranged in a matrix, in which the second substrate has detection electrodes of a touch panel, each of the pixels has a pixel electrode and a counter electrode, the counter electrode is divided into a plurality of blocks, the counter electrode of the respective divided blocks is shared to the respective pixels of a plurality of display lines side by side, the counter electrode of the respective divided blocks is also used as scanning electrodes of the touch panel, a driver circuit is provided to apply a counter voltage and a touch panel scanning voltage to the counter electrode of the respective divided blocks, and the driver circuit can adjust a supply start timing of a touch panel scanning voltage to be applied to the counter electrode of the respective divided blocks, and/or a pulse width of the touch panel scanning voltage to be applied to the counter electrode of the respective divided blocks.

(2) There is provided a liquid crystal display device including a liquid crystal display panel having a first substrate, a second substrate, and liquid crystal held between the first substrate and the second substrate, and having a plurality of pixels arranged in a matrix, in which the second substrate has detection electrodes of a touch panel, each of the pixels has a pixel electrode and a counter electrode, the counter electrode is divided into a plurality of blocks, the counter electrode of the respective divided blocks is shared to the respective pixels of a plurality of display lines side by side, the counter electrode of the respective divided blocks is also used as scanning electrodes of the touch panel, a driver circuit is provided to apply a counter voltage and a touch panel scanning voltage to the counter electrode of the respective divided blocks, and the driver circuit digitally adds a pulse voltage having a desired amplitude value to the counter voltage, and generates the touch panel scanning voltage to be applied to the counter electrode of the respective divided blocks.

The advantages obtained by the typical features of the invention disclosed in the present application will be described in brief as follows.

(1) According to the liquid crystal display device with a touch panel function according to the present invention, the detection sensitivity can be prevented from being degraded by the noise of the gate scan.

(2) According to the liquid crystal display device with a touch panel function according to the present invention, a variation of the touch detection sensitivity for each of the liquid crystal display devices can be reduced.

BRIEF DESCRIPTION OF THE DRAWINGS

FIGS. 15A and 15B are diagrams illustrating exemplary specifications of a timing setting register and a scanning pulse width register in a liquid crystal display device according to an embodiment of the present invention;

FIGS. 19A, 19B, and 19C are diagrams illustrating exemplary specifications of a scanning voltage setting register and a scanning voltage pulse width setting register in the liquid crystal display device according to the embodiment of the present invention.

DETAILED DESCRIPTION OF THE INVENTION

Hereinafter, an embodiment of the present invention will be described in detail with reference to the accompanying drawings.

In all of the drawings illustrating the embodiment, parts having the same functions are denoted by identical symbols, and their repetitive description will be omitted. Also, the following embodiment does not limit the interpretation of the claims of the present invention.

Related Art Example 1

Figure 1:
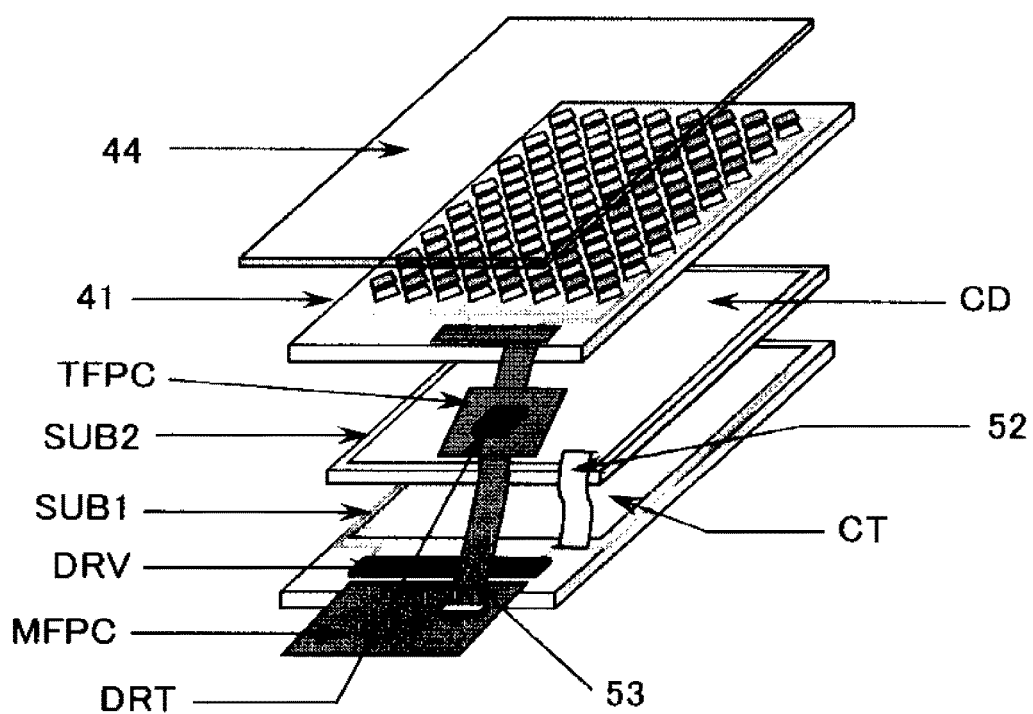
FIG. 1 is an exploded perspective view schematically illustrating a configuration of a liquid crystal display device with a touch panel in a related art example 1.
Figure 2:
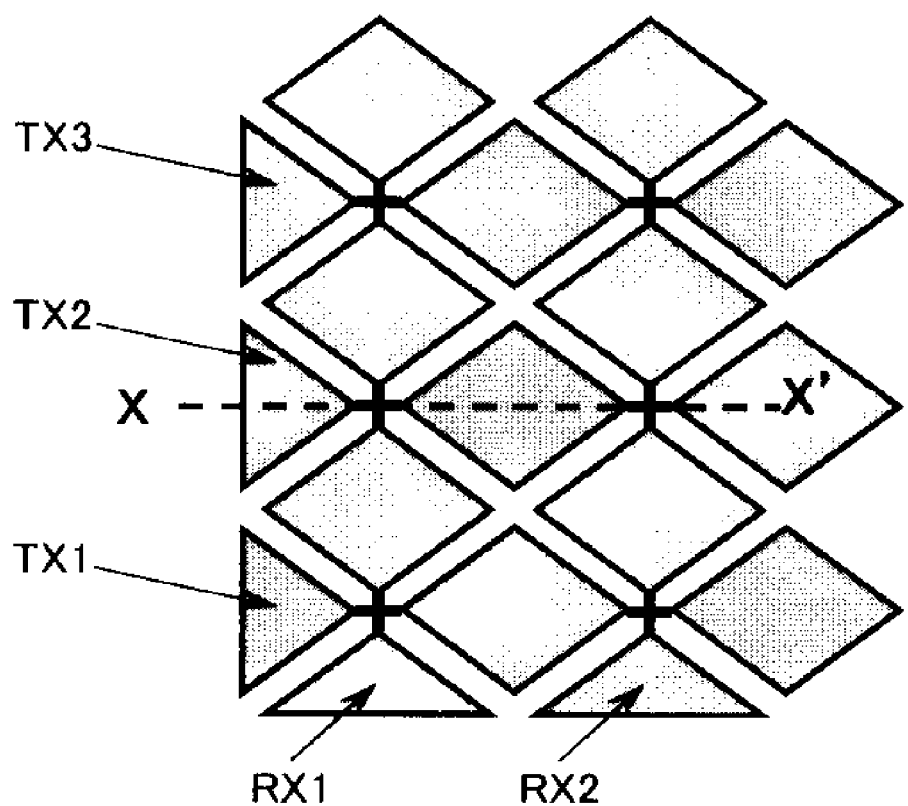
FIG. 2 is a plan view illustrating an electrode configuration of the touch panel illustrated in FIG. 1.

FIG. 1 is an exploded perspective view schematically illustrating a configuration of a liquid crystal display device with a touch panel in a related art example 1;

FIG. 2 is a plan view illustrating an electrode configuration of the touch panel illustrated in FIG. 1.

Figure 3:
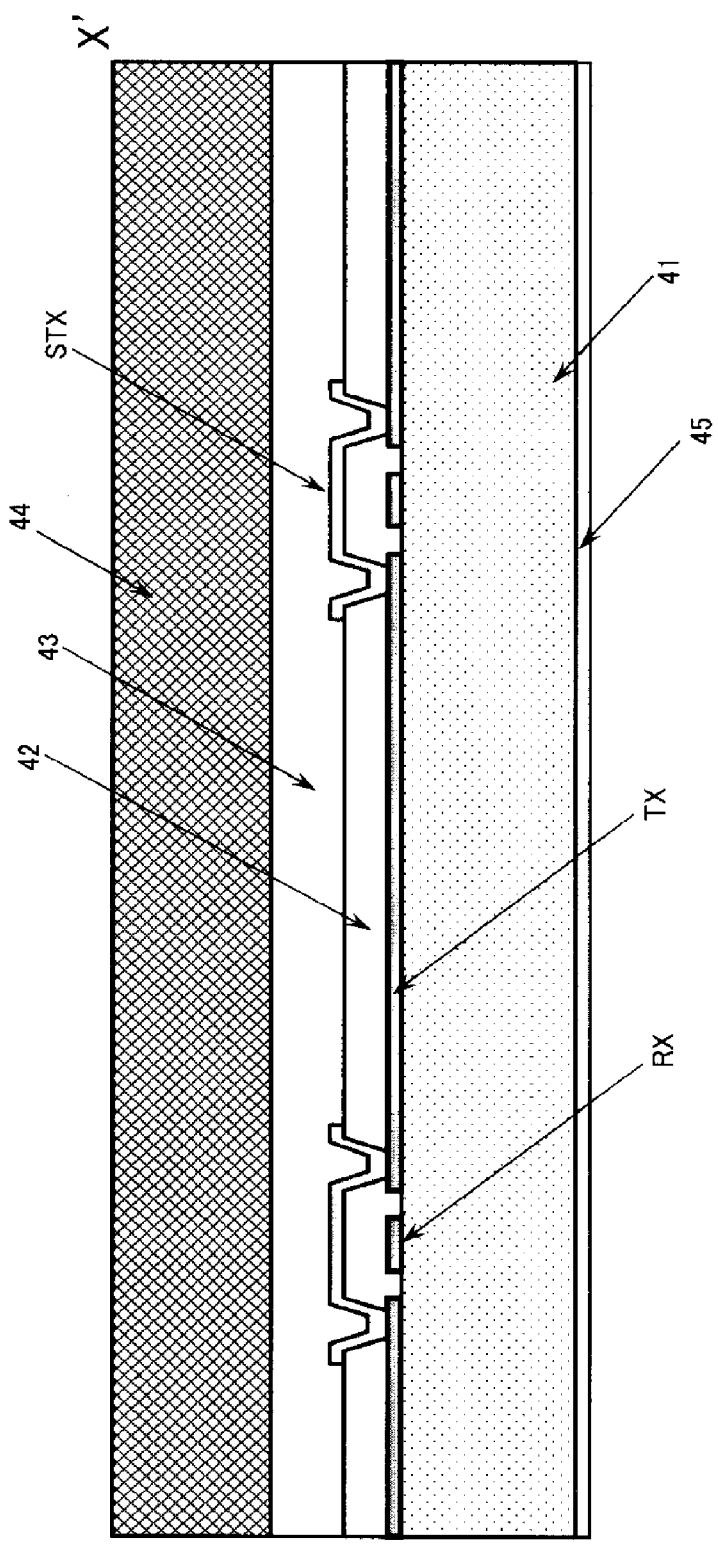
FIG. 3 is a cross-sectional view illustrating a cross-sectional structure of the touch panel illustrated in FIG. 1.

FIG. 3 is a cross-sectional view illustrating a cross-sectional structure of the touch panel illustrated in FIG. 1.

In general, as illustrated in FIG. 2, the touch panel includes scanning electrodes (TX), and detection electrodes (RX) for capacitance detection. In this case, for example, three (TX1 to TX3) of scanning electrodes (TX) and two (RX1, RX2) of detection electrodes (RX) are illustrated. However, the number of electrodes is not limited to this example.

Also, as illustrated in FIGS. 1 and 3, the touch panel includes a touch panel substrate 41, the scanning electrodes (TX) and the detection electrodes (RX) which are formed on the touch panel substrate 41, an interlayer insulating film 42 which is formed on the scanning electrodes (TX) and the detection electrodes (RX), connection portions (STX) which are formed on the interlayer insulating film 42, and electrically connect the respective scanning electrodes (TX) to each other, a protective film 43 that is formed on the connection portions (STX), a front window (or protective film) 44 which is arranged on the protective film 43, and a shield transparent electrode (electrode formed of, for example, an ITO (indium tin oxide) film) 45 formed on the liquid crystal display panel side of the touch panel substrate 41.

In the related art touch panel, the respective scanning electrodes (TX) are pulse-driven at a voltage of about 5V to 10V by a touch panel control IC (DRT), and a change in the voltage across the detection electrodes (RX) is detected to detect a touch position in the touch panel control IC (DRT). That is, since a voltage variation detected by the detection electrode (RX) is changed when a capacitance value between the scanning electrode (TX) and the detection electrode (RX) is changed by a finger or the like to pulse-drive the scanning electrode (TX), a voltage across the detection electrodes (RX) is measured, thereby being capable of detecting the touch position.

The touch panel is installed on a front surface of the liquid crystal display panel. Therefore, when an image displayed on the liquid crystal display panel is watched by a user, because the display image needs to penetrate the touch panel, it is desirable that the touch panel is high in light transmission.

As illustrated in FIG. 1, the liquid crystal display panel includes a first substrate (SUB1; hereinafter called "TFT substrate"), a second substrate (SUB2; hereinafter called "CF substrate"), and liquid crystal (not shown) sandwiched between the TFT substrate (SUB1) and the CF substrate (SUB2).

Also, the TFT substrate (SUB1) has an area larger than that of the CF substrate (SUB2), and a liquid crystal driver IC (DRV) is mounted on a region of the TFT substrate (SUB1) which does not face the CF substrate (SUB2), and a main flexible printed circuit (MFPC) is further mounted on a peripheral portion of one side of the above region.

Referring to FIG. 1, reference symbol CT denotes a counter electrode (also called common electrode), TFPC is a touch panel flexible printed circuit, CD is a rear surface side transparent conductive film, 52 is a connection member, and 53 is a connection flexible printed circuit.

An IPS liquid crystal display panel has no counter electrode (CT) formed on the substrate on which a color filter is disposed unlike a TN liquid crystal display panel and a VA liquid crystal display panel. For that reason, the rear surface side transparent conductive film (CD) formed of a transparent conductive film such as an ITO is formed on a substrate on which the color filter is disposed for the reason that display noise is reduced.

Figure 4:
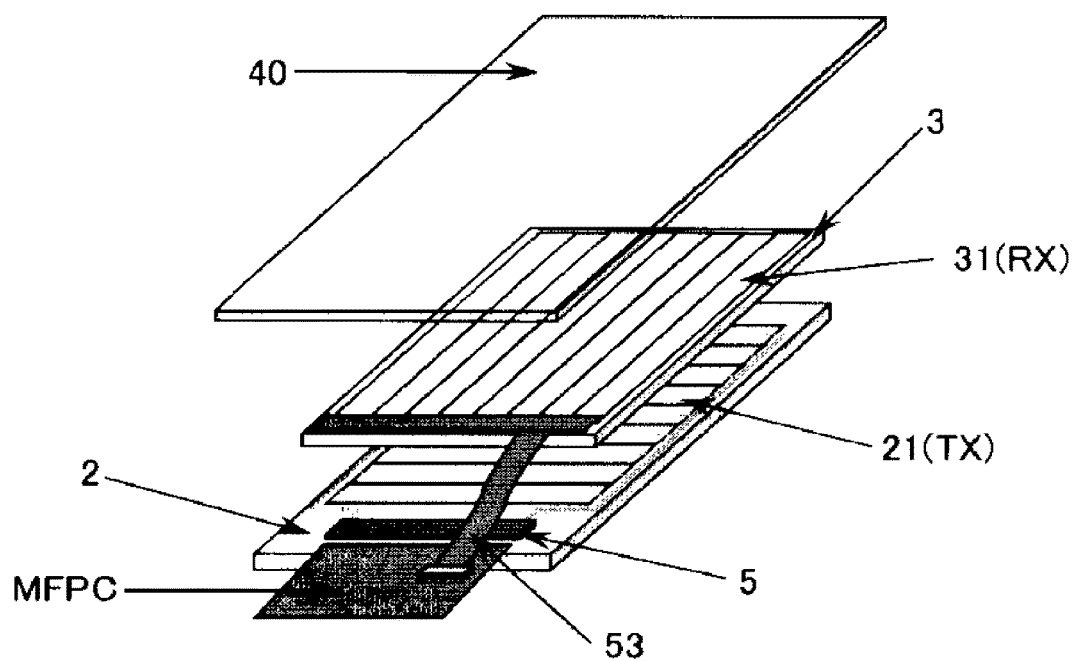
FIG. 4 is an exploded perspective view schematically illustrating a configuration of a liquid crystal display device with a touch panel.

FIG. 4 is an exploded perspective view schematically illustrating a configuration of a liquid crystal display device with a touch panel in which the touch panel is incorporated into the liquid crystal display panel.

Referring to FIG. 4, reference numeral 2 denotes a TFT substrate, 3 is a CF substrate, 21 is counter electrodes (also called "common electrodes"), 5 is a liquid crystal driver IC, MFPC is the main flexible printed circuit, 40 is a front window, and 53 is the connection flexible printed circuit.

In the liquid crystal display device illustrated in FIG. 4, the rear surface side transparent conductive film (CD) on the CF substrate 3 is divided into band-like patterns to form detection electrodes 31 of the touch panel. Also, the counter electrodes 21 formed within the TFT substrate 2 is divided into band-like patterns, that is, divided into a plurality of blocks to be also used as scanning electrodes of the touch panel. With this configuration, the touch panel substrate (41 in FIG. 1) is deleted. For that reason, in the liquid crystal display device illustrated in FIG. 4, the function of the touch panel control IC (DRT) illustrated in FIG. 1 is provided within the liquid crystal driver IC 5.

Subsequently, a description will be given of the counter electrodes 21 and the detection electrodes 31 in the liquid crystal display device illustrated in FIG. 4 with reference to FIG. 5.

As described above, the counter electrodes 21 are disposed on the TFT substrate 2, and the plurality (for example, about 20) of counter electrodes 21 are commonly connected at both ends thereof, and connected to a counter electrode signal line 22.

Figure 5:
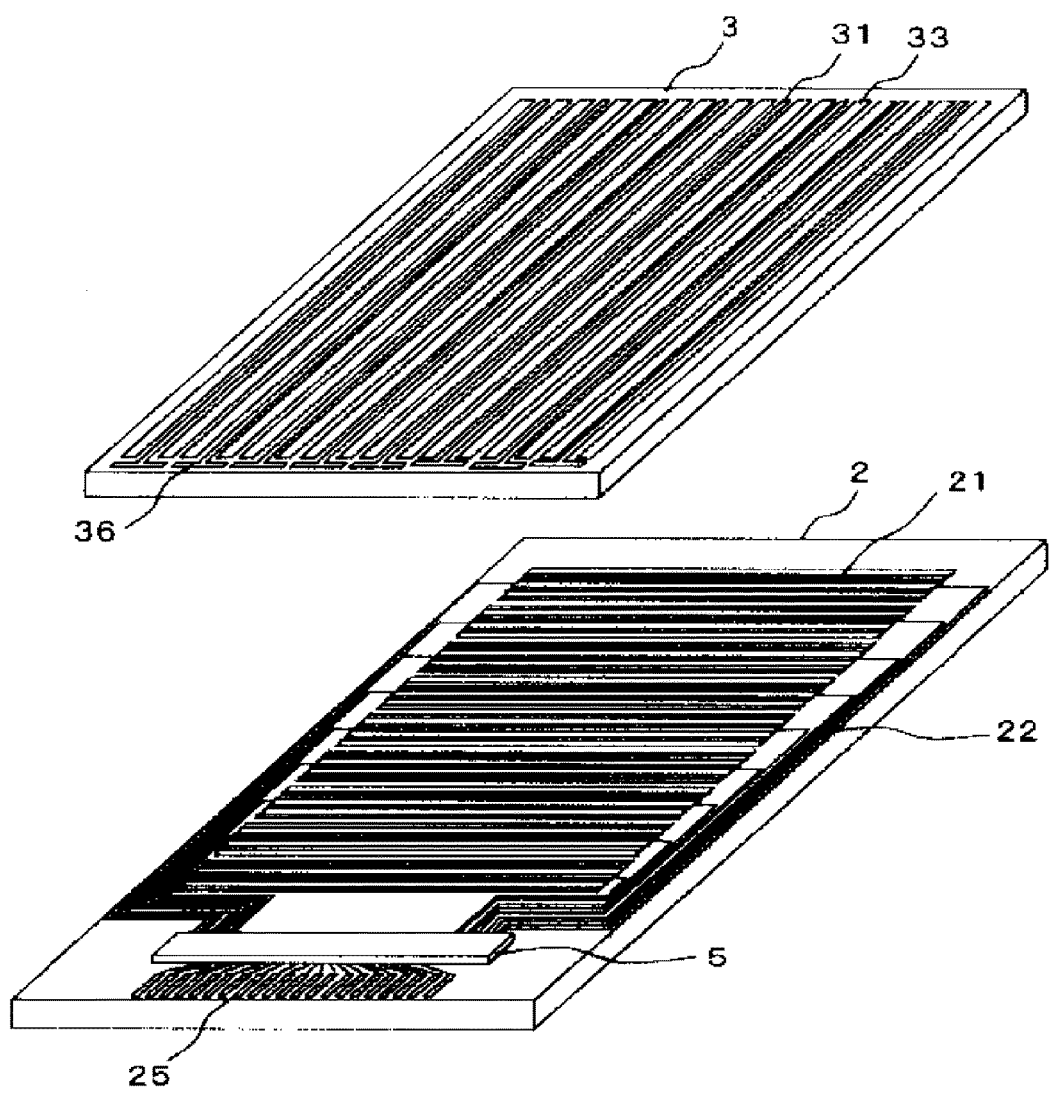
FIG. 5 is a diagram illustrating a counter electrode and a detection electrode in the liquid crystal display device with the touch panel illustrated in FIG. 4.

In the liquid crystal display device illustrated in FIG. 5, a bundle of counter electrodes 21 are also used as the scanning electrodes (TX), and the detection electrodes 31 also configure the detection electrodes (RX).

Therefore, the counter electrode signal includes the counter voltage used for image display and the touch panel scanning voltage used for detection of the touch position. When the touch panel scanning voltage is applied to the counter electrodes 21, a detection signal is generated in the detection electrodes 31 which are arranged at a given interval from the counter electrodes 21, and configure a capacitance. The detection signal is extracted to the external through detection electrode terminals 36.

Dummy electrodes 33 are formed on both sides of the detection electrodes 31. One end of each detection electrode 31 forms the T-shaped detection electrode terminal 36 which is widened toward the dummy electrode 33 on one end thereof.

Also, a variety of lines and terminals such as a driver circuit input terminal 25 are formed on the TFT substrate 2 other than the counter electrode signal line 22.

Figure 6:
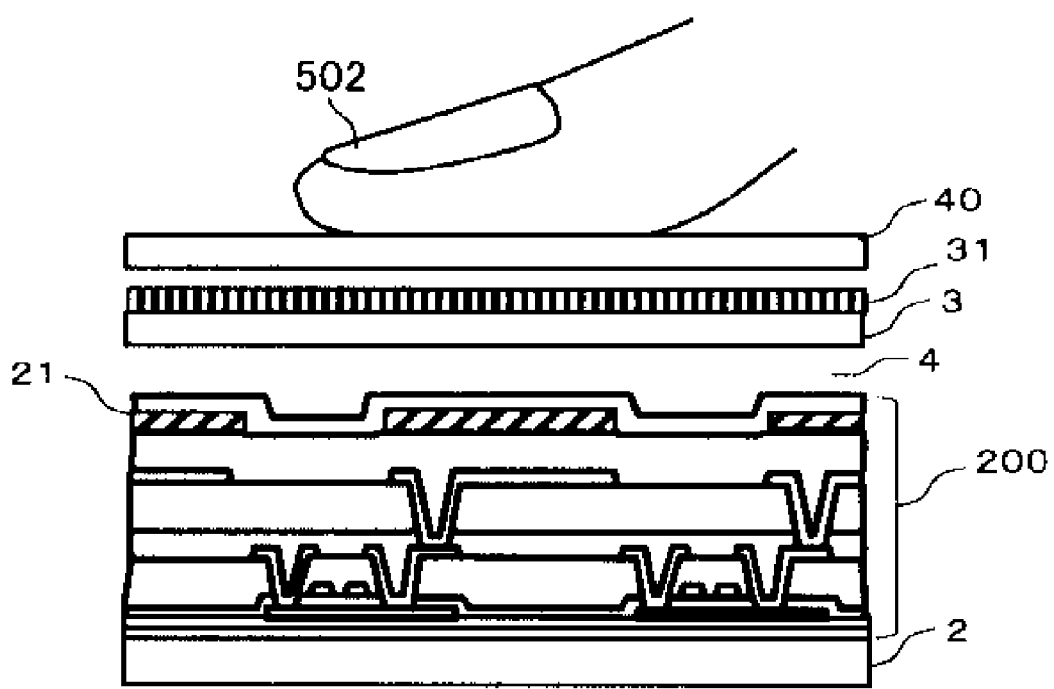
FIG. 6 is a partially enlarged cross-sectional schematic diagram illustrating a display part in the liquid crystal display device with the touch panel illustrated in FIG. 4.

FIG. 6 is a partially enlarged cross-sectional schematic diagram illustrating a display part in the liquid crystal display device with the touch panel illustrated in FIG. 4.

As illustrated in FIG. 6, a pixel portion 200 is disposed on the TFT substrate 2. The counter electrodes 21 are used in the image display as a part of pixels. Also, a liquid crystal composition 4 is sandwiched between the TFT substrate 2 and the CF substrate 3. The detection electrodes 31 disposed on the CF substrate 3 and the counter electrodes 21 disposed on the TFT substrate form a capacitance, and when the drive signal is supplied to the counter electrodes 21, a voltage across the detection electrodes 31 is changed.

In this situation, as illustrated in FIG. 6, when a conductive body such as a finger 502 comes in proximity to or in contact with any detection electrode 31 through the front window 40, the capacitance is changed to change the voltage generated in the detection electrode 31 as compared with a case in which there is no proximity to or contact with the detection electrode 31.

Thus, when a change in the capacitance generated between the counter electrodes 21 and the detection electrodes 31 formed on the liquid crystal display panel is detected, the liquid crystal display panel can be provided with the function of the touch panel.

Figure 7:
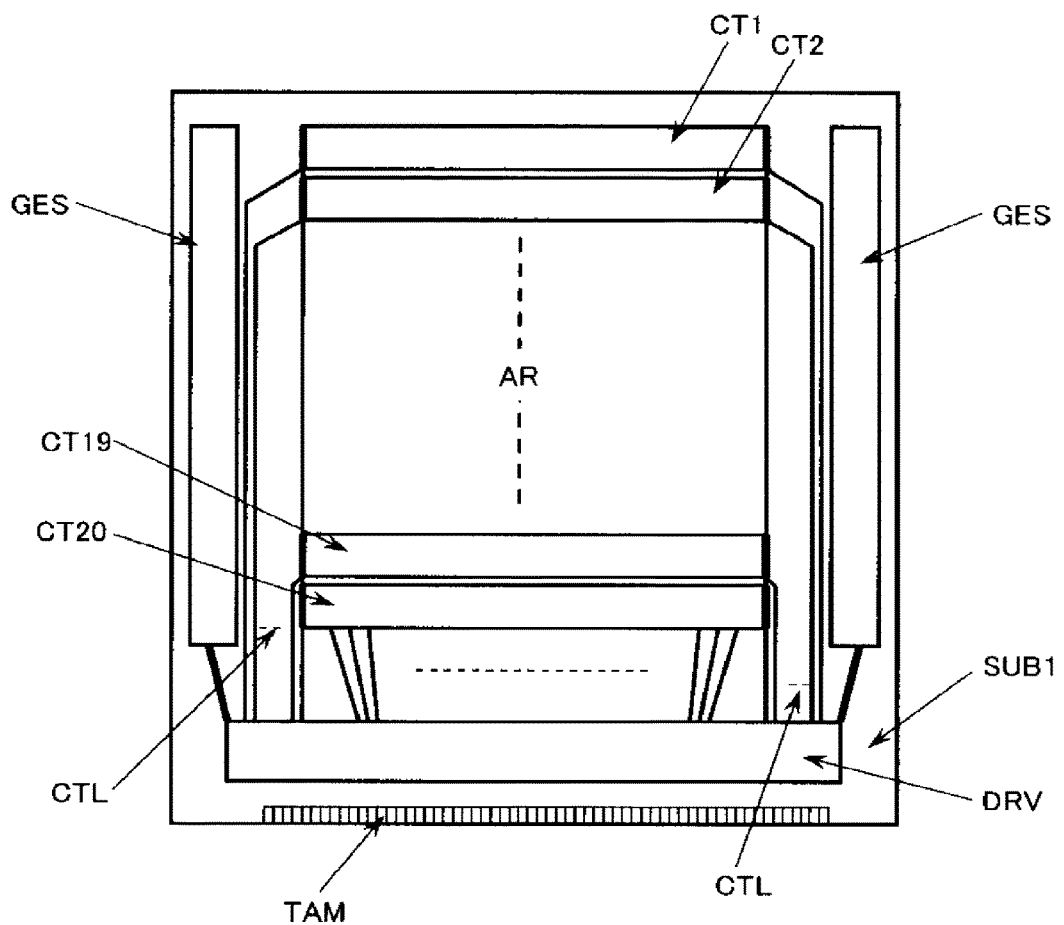
FIG. 7 is a plan view illustrating an example of a counter electrode divided into a plurality of blocks in one example of the liquid crystal display device according to the present invention.

FIG. 7 is a plan view illustrating an example of the counter electrode divided into a plurality of blocks in one example of the liquid crystal display device according to the present invention. Referring to FIG. 7, SUB1 is the TFT substrate, DRV is the liquid crystal driver IC, CT1 to CT20 are the counter electrodes of the respective blocks divided into band-like patterns, GES is a scanning line driver circuit incorporated into the liquid crystal display panel, CTL is counter electrode lines, TAM is a terminal portion connected with the main flexible printed circuit (MFPC), and AR is a display portion including a plurality of pixels arranged in a matrix.

In a capacitance touch panel, because a change in the capacitance due to the finger or the like is detected, it is desirable that a width of the touch panel scanning electrodes (TX) which conducts AC driving is about 4 to 5 mm. For that reason, when the liquid crystal display panel is upsized, the number of scanning electrodes (TX) is increased.

In the example illustrated in FIG. 7, the counter electrode (CT) of 1280 display lines is divided into 20 blocks (one block is configured by the counter electrode for 64 display lines) of CT1 to CT20, and 20 counter electrode lines (CTL) are required at each of right and left.

The counter electrodes (CT1 to CT20) of the respective blocks induce the deterioration of an image quality if the voltage is varied due to the parasitic capacitance in the display operation. For that reason, because there is a need to decrease a resistance value of the counter electrode lines (CTL) that connect the counter electrodes (CT1 to CT20) of the respective blocks, and the liquid crystal driver IC (DRV), when the number of divisions of the counter electrode (CT) is increased with the upsized liquid crystal display panel, the line region of the counter electrode lines (CTL) is increased with the result that a width of right and left frames of the liquid crystal display panel is increased.

Figure 8:
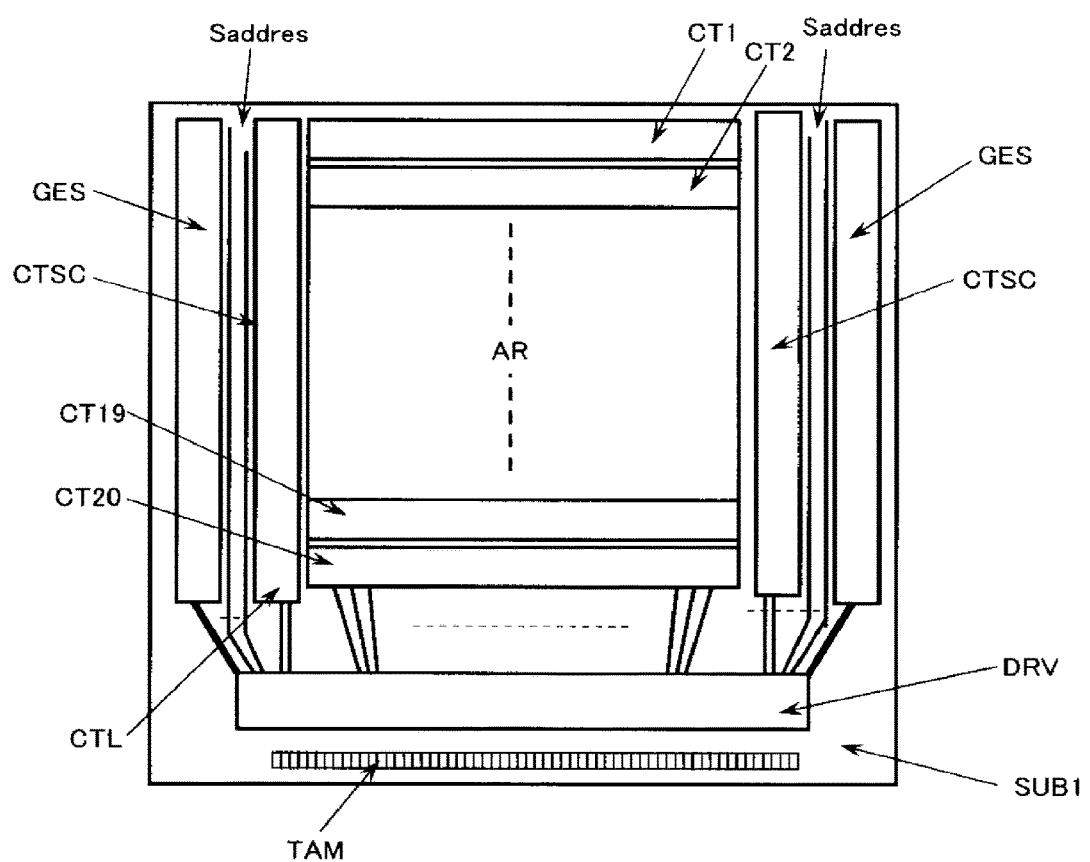
FIG. 8 is a plan view illustrating a method of driving the counter electrode divided into the plurality of blocks in another example of the liquid crystal display device according to the present invention.

FIG. 8 is a plan view illustrating a method of driving the counter electrode divided into the plurality of blocks in another example of the liquid crystal display device according to the present invention.

The liquid crystal display device illustrated in FIG. 8 is different from the liquid crystal display device illustrated in FIG. 7 in that a counter electrode selector circuit (CTSC) that selects any one of the respective counter electrodes (CT1 to CT20) divided into 20 blocks according to an address decode system is incorporated into the liquid crystal display panel.

When a method of selecting the counter electrodes (CT1 to CT20) divided into 20 blocks is conducted by the address decode system, the number of lines requiring a low resistance is two for a counter voltage (Vcom) to be applied to the counter electrodes (CT1 to CT20), and a touch panel scanning voltage (Vstc).

In this embodiment, the touch panel scanning voltage (Vstc) applies a DC voltage higher than the counter voltage (Vcom) by 5 to 10 V, selects a portion to be scanned according to an address signal (addres) supplied through address signal lines (Saddres), and switchingly outputs the counter voltage (Vcom) or the touch panel scanning voltage (Vstc) to the counter electrode (CT) of the selected block, which is also used as the scanning electrode (TX), according to a touch panel scanning signal (STC).

Even when the number of divisions of the counter electrode (CT) is increased, the increased lines are only the address signal lines (Saddres), and the number of divisions of the counter electrodes used as the touch panel scanning electrode can be increased while suppressing an increase in the width of the right and left frames of the liquid crystal display panel.

Figure 9:
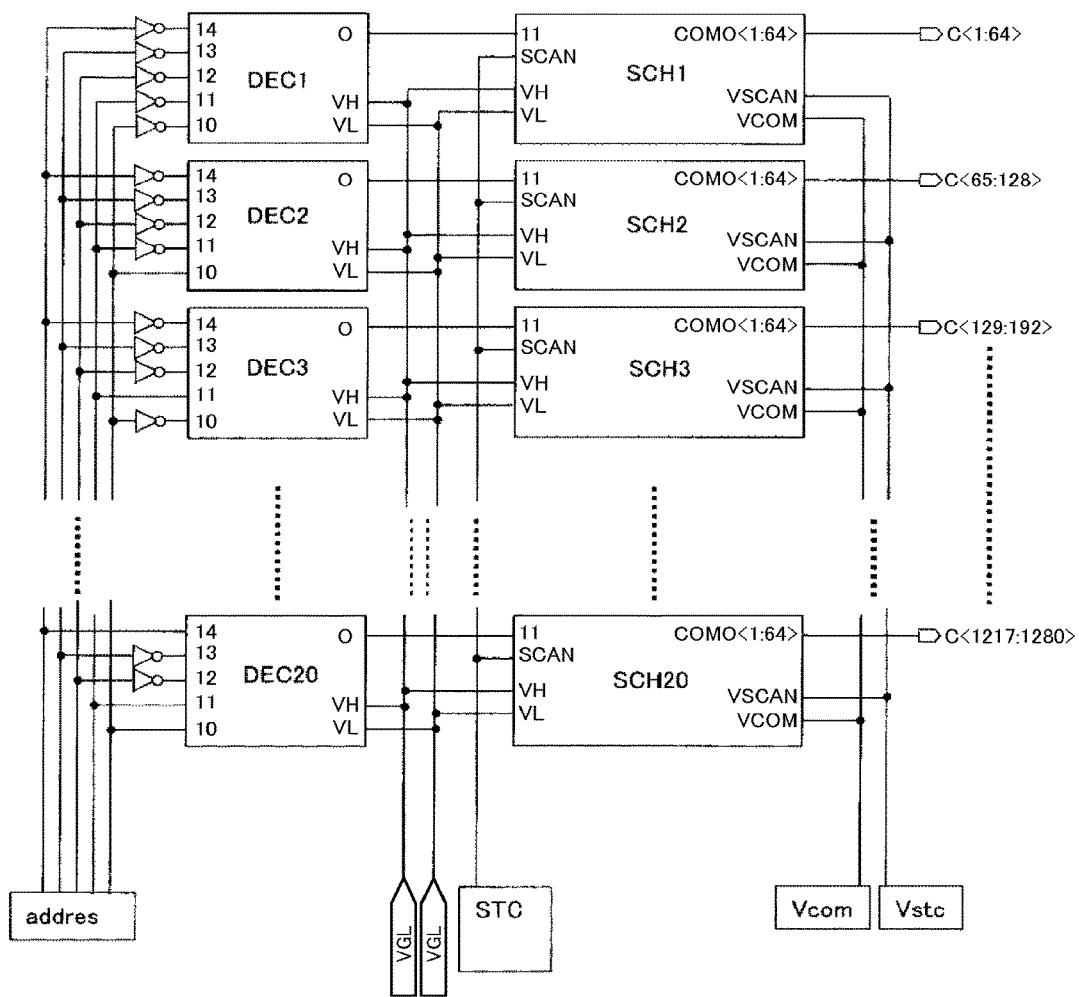
FIG. 9 is a block diagram illustrating a configuration example of a counter electrode selector circuit illustrated in FIG. 8.

FIG. 9 is a block diagram illustrating a configuration example of the counter electrode selector circuit (CTSC) illustrated in FIG. 8. As illustrated in FIG. 9, the counter electrode selector circuit (CTSC) includes address decoder circuits DEC1 to DEC20, and selector circuits SCH1 to SCH20.

In the liquid crystal display device illustrated in FIG. 8, the counter electrodes (CT) for 64 display lines are electrically connected within the liquid crystal display panel as one block, and 1280 display lines are divided into 20 pieces, so that the scanning electrodes (TX) of the touch panel are arrayed at 5 mm pitches. Then, the counter electrodes (CT1 to CT20) divided into 20 pieces, and the address decoder circuits (DEC1 to DEC20) are allocated to each other one-on-one. Because the number of divisions is 20 blocks, five address signal lines (Sadd) of 5 bits are required.

The counter electrode for one block, that is, the counter electrode (CT) for 64 display lines, which is selected according to the address signal (addres), conduct AC driving according to the touch panel scanning signal (STC), and the other counter electrodes (CT) output the counter voltage.

Figure 10:
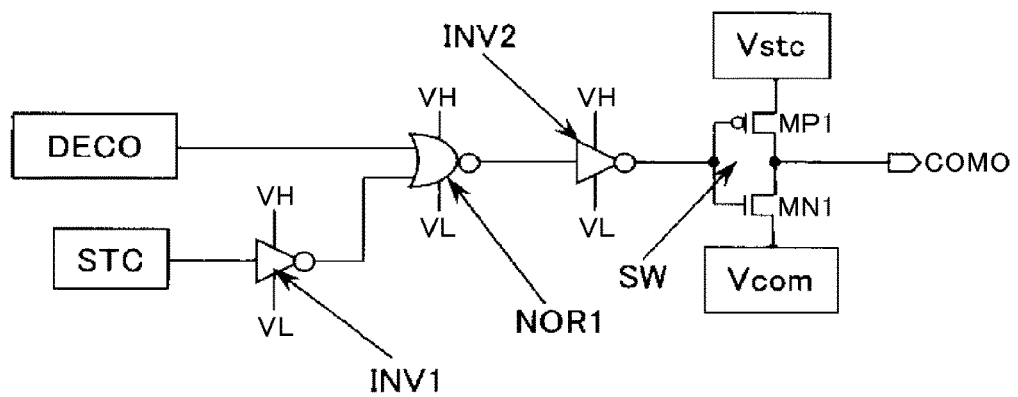
FIG. 10 is a circuit diagram illustrating an exemplary circuit configuration of the selector circuit illustrated in FIG. 9.

FIG. 10 is a circuit diagram illustrating an exemplary circuit configuration of the selector circuits (SCH1 to SCH20) illustrated in FIG. 9.

The selector circuit illustrated in FIG. 10 inputs an output (DECO) of the address decoder circuits (DEC1 to DEC20), and an inversion signal of the touch panel scanning signal (STC) inverted by an inverter (INV1) to a NOR circuit (NOR1), inverts an output of the NOR circuit (NOR1) by an inverter (INV2), and inputs the inverted output to a switch circuit (SW) to select the touch panel scanning voltage (Vstc) or the counter voltage (Vcom) and output the selected voltage to the counter electrodes (CT1 to CT20) of the respective blocks.

With the above configuration, if one of the address decoder circuits (DEC1 to DEC20) is selected, the selector circuit switchingly outputs the touch panel scanning voltage (Vstc) and the counter voltage (Vcom) to the counter electrodes of the respective blocks according to the touch panel scanning signal (STC).

That is, in the selector circuit illustrated in FIG. 8, when the output (DECO) of the address decoder circuits (DEC1 to DEC20) is low level (hereinafter referred to as "L level"), and the touch panel scanning signal (STC) is high level (hereinafter referred to as "H level"), since the output of the NOR circuit (NOR1) become H level, the switch circuit (SW) selects the touch panel scanning voltage (Vstc). When the touch panel scanning signal (STC) is L level, or the output (DECO) of the address decoder circuits (DEC1 to DEC20) is H level, since the output of the NOR circuit (NOR1) becomes L level, the switch circuit (SW) selects the counter voltage (Vcom).

Figure 11:
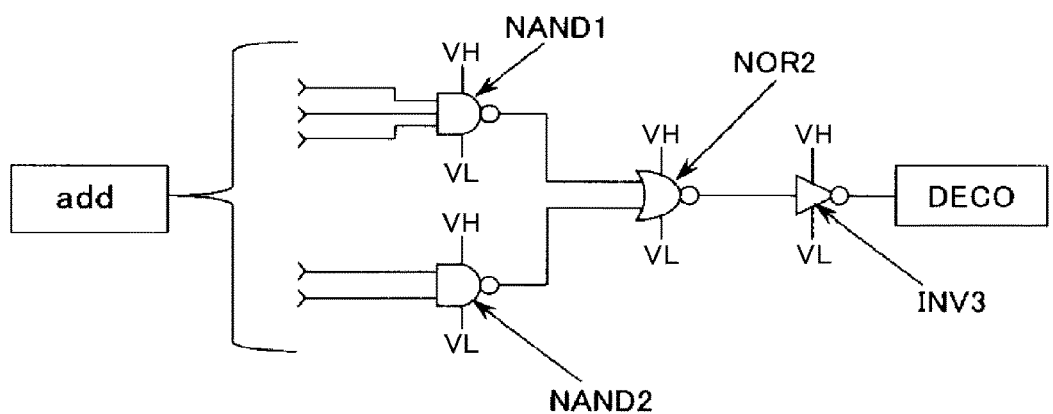
FIG. 11 is a circuit diagram illustrating an exemplary circuit configuration of an address decoder circuit illustrated in FIG. 9.

FIG. 11 is a circuit diagram illustrating an exemplary circuit configuration of the address decoder circuits (DEC1 to DEC20) illustrated in FIG. 9.

As illustrated in FIG. 11, each of the address decoder circuits (DEC1 to DEC20) receives the address signal or the inversion signal obtained by inverting the address signal by the inverter (INV) with respect to each of five address signals (addres), and decodes the signal on the basis of the combination of the five address signals (addres) and the inversion signals of the five address signals (addres).

In the address decoder circuit illustrated in FIG. 11, an address signal (add) of a given combination of the five address signal (addres) and the inversion signal of the five address signal (addres) is input to NAND circuits (NAND1, NAND2), outputs of the NAND circuits (NAND1, NAND2) are input to a NOR circuit (NOR2), an output of the NOR circuit (NOR2) is inverted by an inverter (INV3) as the output (DECO) of the address decoder circuit. Therefore, in the address decoder circuit illustrated in FIG. 11, if the combination of the address signal matches the combination of the address signal set in the subject address decoder circuit, a voltage of the L level is output as the output (DECO) of the address decoder circuit. If the combination of the address signal does not match the combination of the address signal set in the subject address decoder circuit, a voltage of the H level is output as the output (DECO) of the address decoder circuit.

Figure 12:
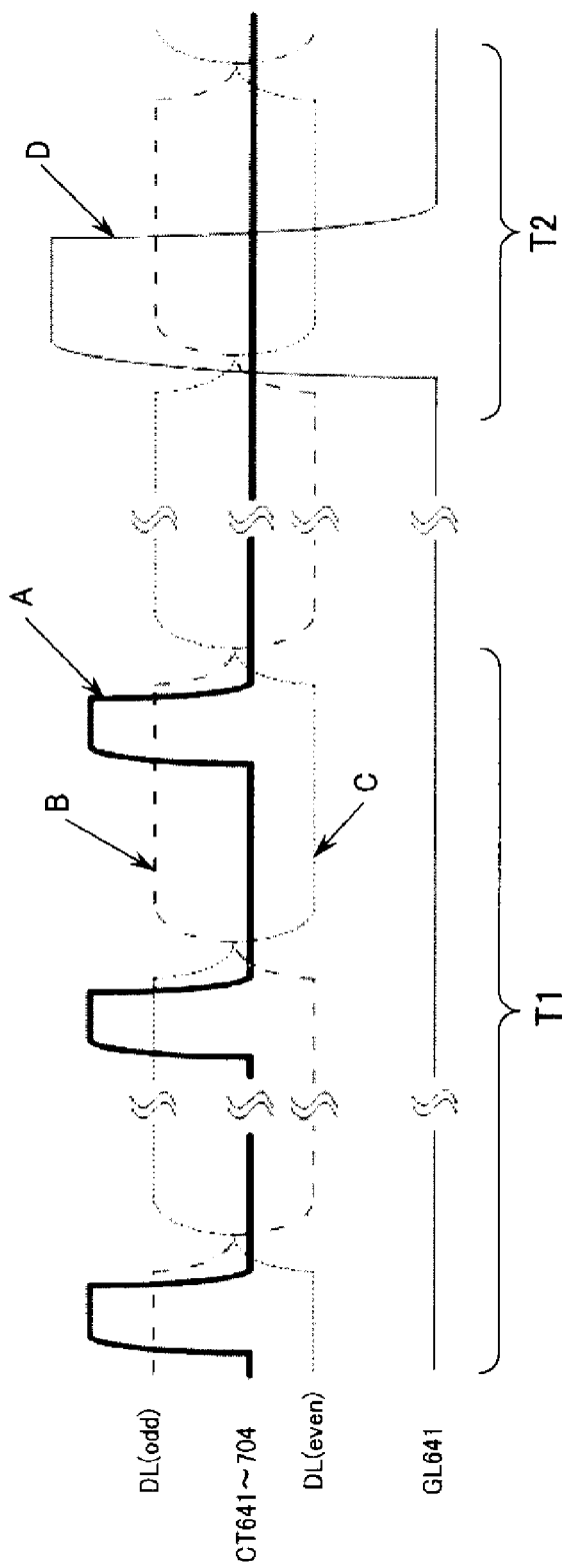
FIG. 12 is a diagram illustrating drive waveforms in a touch panel detection operation and in a pixel write operation in the liquid crystal display device with the touch panel.

FIG. 12 is a diagram illustrating drive waveforms in a touch panel detection operation and in a pixel write operation in the liquid crystal display device with the touch panel.

A symbol A in FIG. 12 represents a voltage waveform of the touch panel scanning voltage (Vstc) which is applied to a counter electrode (CT11) of 641 to 704 display lines which is an 11-th block among the counter electrodes divided into 20 blocks. Also, a symbol B in FIG. 12 represents a waveform of a video voltage to be applied to video lines (DL) of odd columns, a symbol C in FIG. 12 represents a waveform of a video voltage to be applied to video lines (DL) of even columns, and D in FIG. 12 represents a gate signal which is supplied to the gate electrode of a thin film transistor of a 641-st display line through a 641-st scanning line (GL). Further, T1 represents a touch position detection period, and T2 represents a pixel write period.

The touch position detection period (T1) is set to a period other than the pixel write period (T2), for the purpose of preventing an influence on the display. Also, in the touch position detection period (T1), for the purpose of increasing the detection sensitivity, a plurality of scanning operation is conducted on the scanning electrode (TX) at the same portion, that is, in FIG. 12, the touch panel scanning voltage (Vstc) is applied to the counter electrode (CT11) of the 11-th block by plural times. Also, within the pixel write period (T2), not the touch panel scanning voltage (Vstc) but the counter voltage (Vcom) is applied to the counter electrode (CT11) of the 11-th block.

Figure 13:
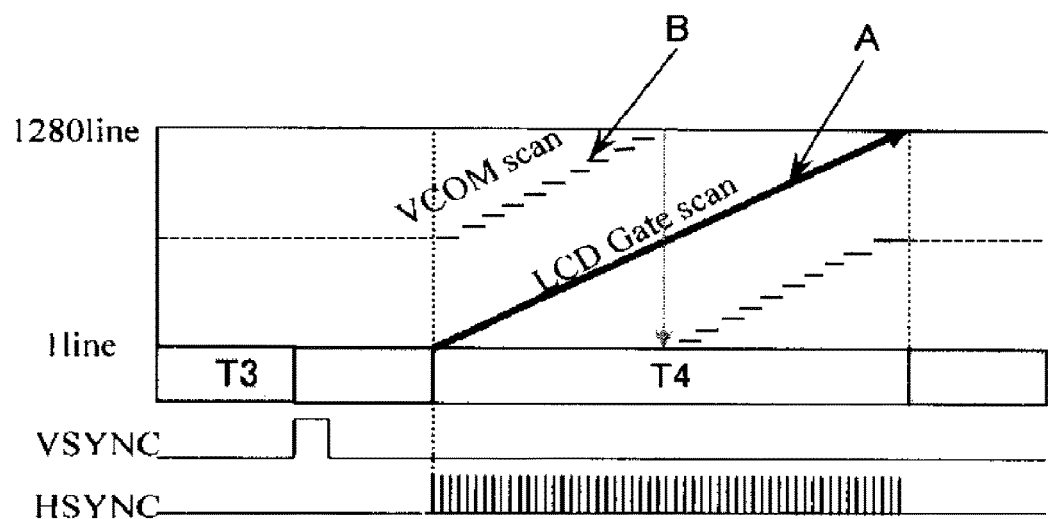
FIG. 13 is a diagram illustrating timing in the touch panel detection operation and in the pixel write operation in the liquid crystal display device with the touch panel.

FIG. 13 is a diagram illustrating timing in the touch panel detection operation and in the pixel write operation in the liquid crystal display device with the touch panel.

A symbol A in FIG. 13 represents a pixel write timing from a first display line to a 1280 display line in a pixel write period (T4) of one frame, and B in FIG. 13 represents a touch panel detection timing in the counter electrodes (CT1 to CT20) of the respective blocks divided into 20 blocks.

As illustrated in FIG. 13, the counter electrode of an arbitrary display line functions as the scanning electrodes (TX), and the scanning operation at the time of touch panel detection is conducted at a portion different from that of the gate scan that conducts pixel write. In FIG. 13, T3 denotes a flyback period, VSYNC is a vertical synchronization signal, and HSYNC is a horizontal synchronization signal.

Figure 14:
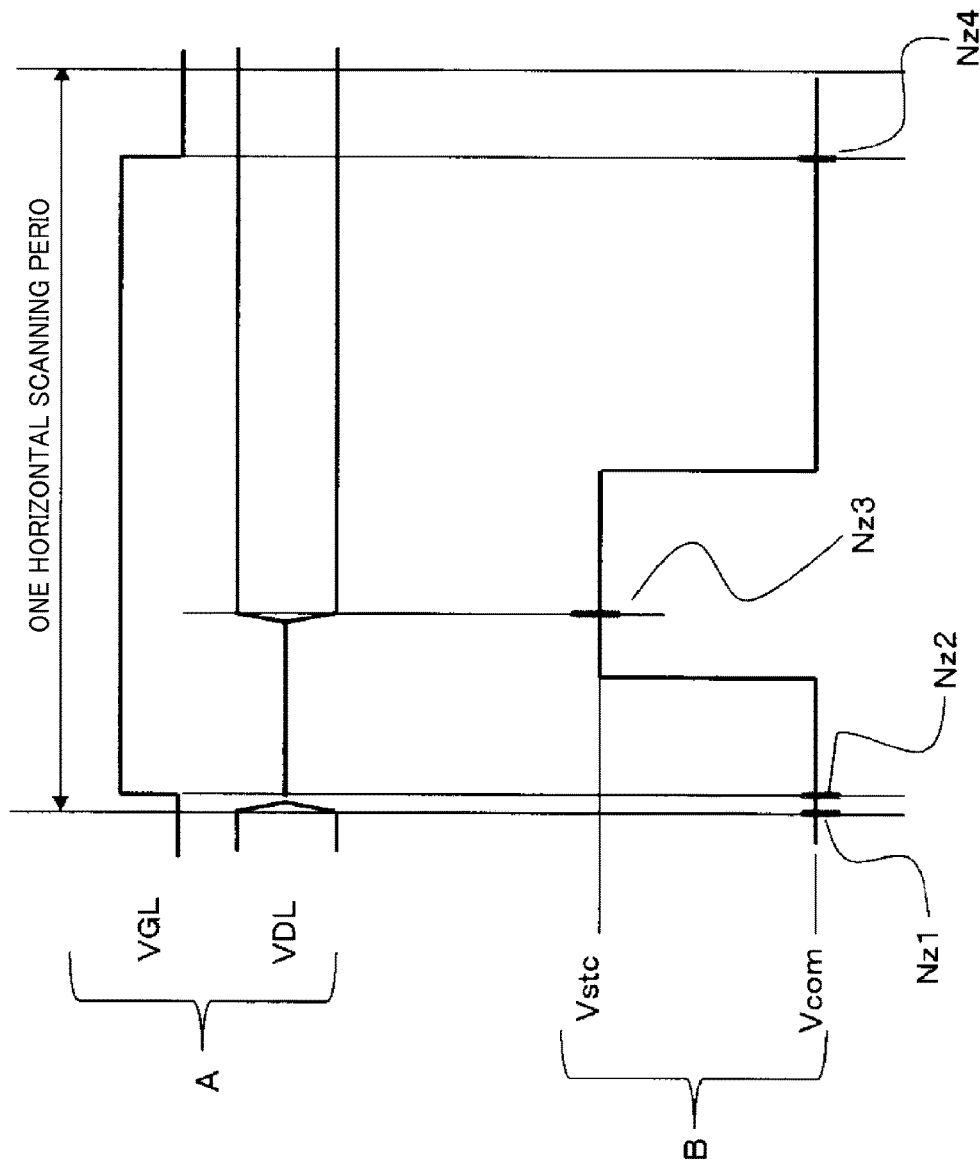
FIG. 14 is a diagram illustrating a video voltage, a scanning voltage, and a touch panel scanning timing in one horizontal scanning period, in the liquid crystal display device with the touch panel.

FIG. 14 is a diagram illustrating a video voltage, a scanning voltage, and a touch panel scanning timing in one horizontal scanning period, in the liquid crystal display device with the touch panel.

As described in FIG. 13, gate scan (A in FIG. 14) and touch panel scan (B in FIG. 14) are implemented on different display lines. However, because a parasitic capacitance is present between the video line and the counter electrode (CT), a rising waveform of the touch panel scanning voltage (Vstc) strains due to noise (Nz1 and Nz3 in FIG. 14) generated by a variation in a voltage (VDL) on the video line. As a result, a detection current to the detection electrode (31 in FIG. 4) is reduced to deteriorate the detection sensitivity.

Likewise, because the parasitic capacitance is present between the scanning line and the counter electrode (CT), the rising waveform of the touch panel scanning voltage (Vstc) strains due to noise (Nz2 and Nz4 in FIG. 14) generated at the rising or falling time of a selection scanning voltage (VGL). As a result, the detection current to the detection electrode (31 in FIG. 4) is reduced to deteriorate the detection sensitivity.

Also, when a pulse width of the touch panel scanning voltage (Vstc) is reduced at a far end of the counter electrode lines (CTL) due to a resistance of the counter electrode lines (CTL), the detection sensitivity is deteriorated.

Under the circumstance, in this embodiment, the liquid crystal driver IC (DRV) has a function of adjusting the rising timing and the pulse width of the touch panel scanning voltage (Vstc).

The adjustment of the rising timing and the pulse width of the touch panel scanning voltage (Vstc) is executed with the use of a timing setting register and a scanning pulse width register which are installed within the liquid crystal driver IC (DRV).

FIGS. 15A and 15B are diagrams illustrating exemplary specifications of the timing setting register and the scanning pulse width register according to an embodiment of the present invention.

Figure 16:
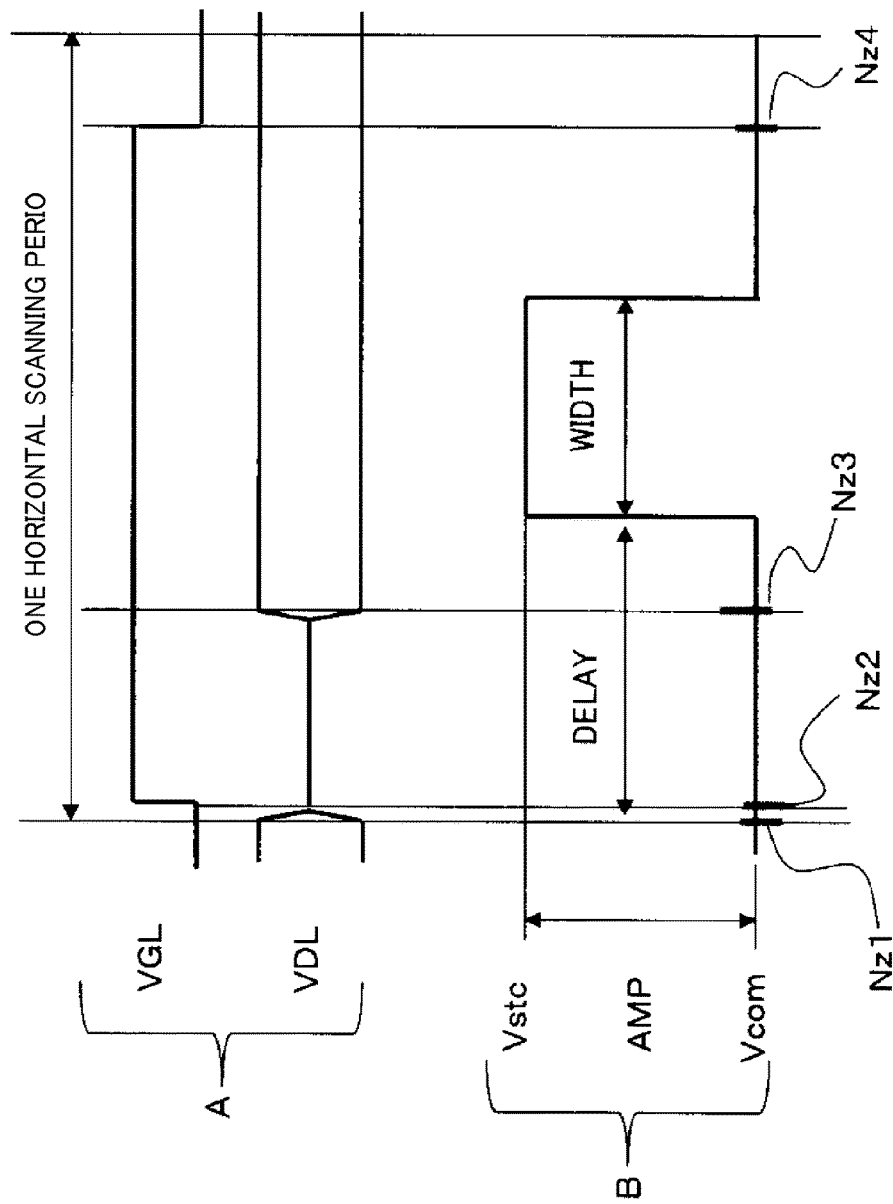
FIG. 16 is a diagram illustrating an example of a video voltage, a scanning voltage, and a touch panel scanning timing in one horizontal scanning period, in the liquid crystal display device according to the embodiment of the present invention.

FIG. 16 is a diagram illustrating an example of the video voltage, the scanning voltage, and the touch panel scanning timing in one horizontal scanning period, in the liquid crystal display device according to the embodiment of the present invention.

As illustrated in FIG. 15A, the rising timing (DELAY in FIG. 16) of the touch panel scanning voltage (Vstc) can be freely adjusted from a base time point in one horizontal scanning period at 0.5 μs pitches by data set in the timing setting register.

As a result, as illustrated in FIG. 16, the rising timing of the touch panel scanning voltage (Vstc) within one horizontal scanning period can be freely shifted from the voltage transition timing of the video voltage (VDL) on the video line, and the rising or falling time of the selection scanning voltage (VGL), for each liquid crystal display panel.

A reference position is set to the voltage variation timing of the video voltage (VDL) on the video line, or the rising or falling time of the selection scanning voltage (VGL).

Further, the pulse width (WIDTH in FIG. 16) of the touch panel scanning voltage (Vstc) can be freely adjusted at 0.5 μs pitches, by the data set in the scanning pulse width register illustrated in FIG. 15A.

With the above configuration, because the pulse width of the touch panel scanning voltage (Vstc) within one horizontal scanning period can be freely set for each liquid crystal display panel, the detection sensitivity can be optimized according to the respective line loads even in the liquid crystal display panel different in the line load of the counter electrode lines (CTL) that applies the counter voltage (Vcom) to the counter electrode (CT) such that the scanning line driver circuit (GES) is a thin-film transistor (a-Si TFT) having a semiconductor layer made of amorphous silicon (a-Si), or a thin-film transistor (p-Si TFT) having a semiconductor layer made of polysilicon (p-Si).

Thus, data that becomes an appropriate amount of delay is written into the timing setting register and the scanning pulse width register, thereby preventing noise from the gate scan from interfering with the touch panel scanning to optimize the detection sensitivity of the liquid crystal display panel different in the line load of the counter electrode lines (CTL).

In the liquid crystal display device with the touch panel, the counter electrode (CT) on the TFT substrate (SUB1; TFT substrate) is divided, and also used as the scanning electrodes for the touch panel.

As in this embodiment, the liquid crystal driver IC (DRV) has the function of adjusting the rising timing of the touch panel scanning voltage (Vstc), as a result of which the rising timing of the touch panel scanning voltage (Vstc) can be shifted from the noise generation timing caused by the display operation, and the interference of the noise can be prevented.

Also, as in this embodiment, the liquid crystal driver IC (DRV) has the pulse width adjustment function of the touch panel scanning voltage (Vstc) with the results that, even in the liquid crystal display panel different in the line load of the counter electrode lines (CTL), the detection sensitivity can be optimized according to the respective line loads. The touch detection sensitivity can be improved by the above timing adjustment function.

The detection sensitivity is improved because a larger amount of current flows in the detection electrodes (RX) for touch panel as the voltage amplitude of the touch panel scanning voltage (Vstc) is larger.

If the detection sensitivity needs to be improved, the touch panel scanning voltage (Vstc) is set to be higher. However, because the withstand voltage across the output terminal having the touch panel scanning voltage (Vstc) of the liquid crystal driver IC (DRV), and the output terminal of the counter voltage (Vcom) is 6V, a potential difference between the touch panel scanning voltage (Vstc) and the counter voltage (Vcom) must be set to 6V or lower in use.

However, in the liquid crystal display device with the touch panel, because the counter electrode (CT) is also used as the scanning electrodes (TX) for the touch panel, the L level voltage of the touch panel scanning voltage (Vstc) is the counter voltage (Vcom), and the voltage value is different for each liquid crystal display panel.

In particular, the liquid crystal display panel using the thin film transistor (a-Si TFT) having the semiconductor layer made of amorphous silicon (a-Si), which can be inexpensively fabricated as compared with the thin film transistor (p-Si TFT) having the semiconductor layer made of polysilicon (p-Si), is large in common voltage variation for each of the liquid crystal display panels, and therefore if the touch panel scanning voltage (Vstc) is set as a fixed value, the common voltage variation may exceed the withstand voltage of 6V.

Under the circumstance, in this embodiment, the liquid crystal driver IC (DRV) has a scanning voltage pulse amplitude setting register having a function of selecting the touch panel scanning voltage (Vstc) obtained by adding the set amplitude voltage to the counter voltage (Vcom) for each liquid crystal display panel, and outputs the selected touch panel scanning voltage (Vstc).

Figure 17:
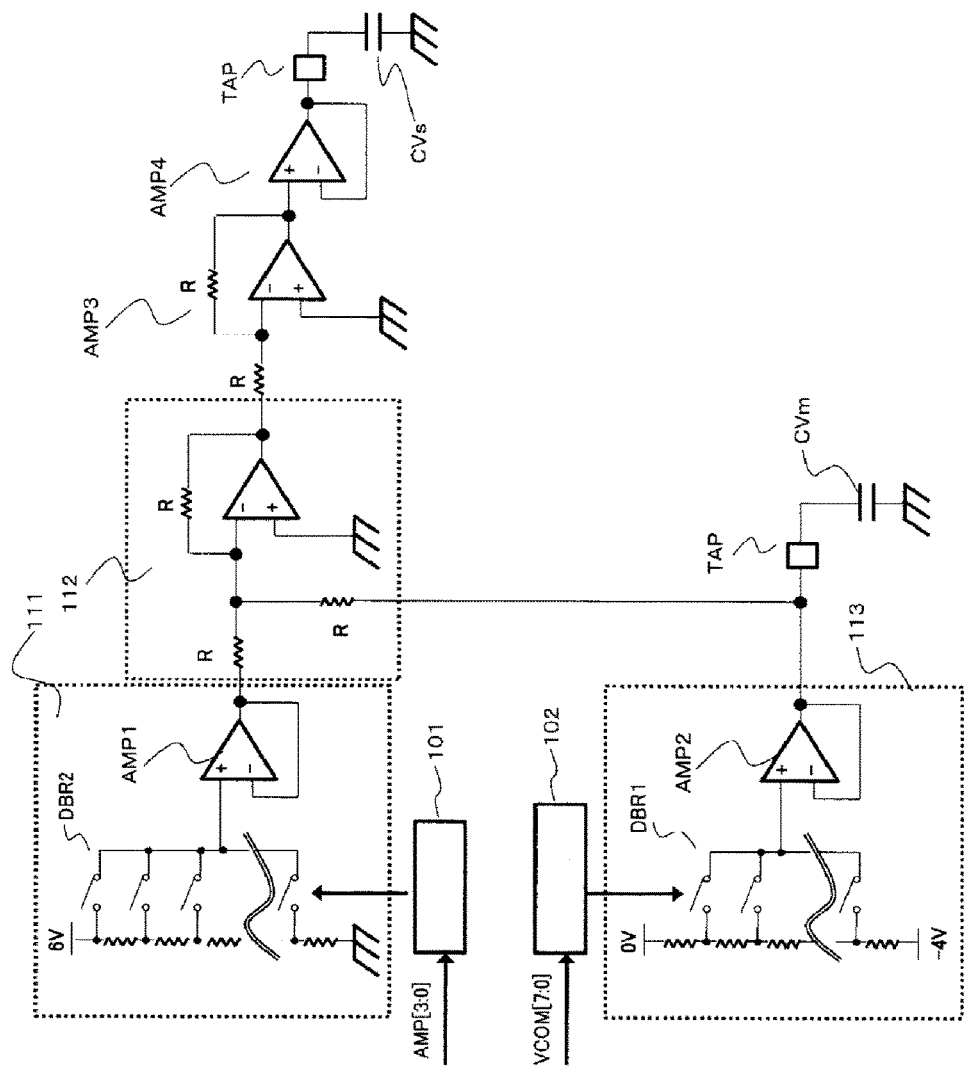
FIG. 17 is a diagram illustrating a circuit configuration that outputs a touch panel scanning voltage obtained by adding a set amplitude voltage to a counter voltage for each related-art liquid crystal display panel.

FIG. 17 illustrates a circuit configuration that outputs the touch panel scanning voltage (Vstc) obtained by adding the set amplitude voltage to the counter voltage (Vcom) for each related-art liquid crystal display panel.

In the circuit configuration illustrated in FIG. 17, the counter voltage (Vcom) generated by a counter voltage generator circuit 113, and a touch panel scanning voltage amplitude value (AMP in FIG. 16) generated by a scanning voltage pulse width generator circuit 111 are added together by an adder 112 formed of an operational amplifier to generate the touch panel scanning voltage (Vstc).

In this example, the counter voltage generator circuit 113 generates the counter voltage (Vcom) on the basis of a counter voltage register 102, and the scanning voltage pulse width generator circuit 111 generates the touch panel scanning voltage amplitude value on the basis of a scanning voltage pulse width setting register 101.

Also, data (VCOM [7:0] for setting the counter voltage (Vcom) from the external is set for the counter voltage register 102, and an electron variable resistor circuit (DBR1) is controlled on the basis of the value set in the counter voltage register 102 so that the counter voltage (Vcom) can be adjusted, for example, on a 0.025V basis.

Likewise, data (AMP [3:0] for setting the touch panel scanning voltage amplitude value (AMP in FIG. 16) from the external is set for the scanning voltage pulse width setting register 101, and an electron variable resistor circuit (DBR2) is controlled on the basis of the value set in the scanning voltage pulse width setting register 101 so that the touch panel scanning voltage amplitude value (AMP in FIG. 16) can be adjusted, for example, on a 0.2V basis.

Also, in FIG. 17, amplifier circuits (AMP1, AMP2, AMP4) operate as buffer circuits, and amplifier circuit (AMP3) operates as a voltage inverting circuit of a gain 1. Further, referring to FIG. 17, reference symbol Cvs denotes a scanning voltage stabilization capacitive element, CVm is a counter voltage stabilization capacitive element, and TAP is an output terminal of the liquid crystal driver IC (DRV).

However, because a circuit area is large in a system using an analog circuit illustrated in FIG. 17, a chip size of the liquid crystal driver IC (DRV) is increased.

Figure 18:
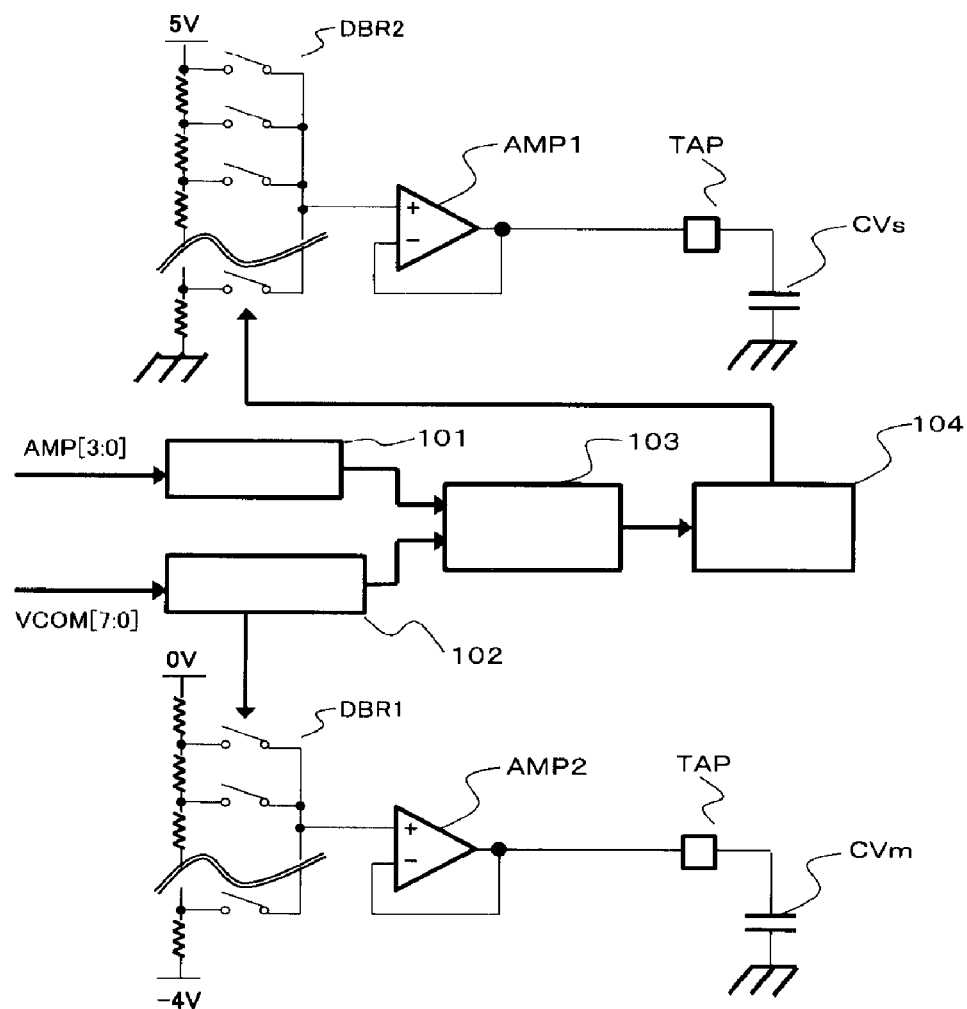
FIG. 18 is a diagram illustrating a circuit configuration that outputs the touch panel scanning voltage obtained by adding the set amplitude voltage to the counter voltage for each liquid crystal display panel, in the liquid crystal display device according to the embodiment of the present invention.

FIG. 18 is a diagram illustrating a circuit configuration that outputs the touch panel scanning voltage (Vstc) obtained by adding the set amplitude voltage to the counter voltage (Vcom) for each liquid crystal display panel according to the embodiment of the present invention.

FIGS. 19A, 19B, and 19C are diagrams illustrating exemplary specifications of the counter voltage setting register 102 and the scanning voltage pulse width setting register 101 according to the embodiment of the present invention.

In this embodiment, data (VCOM [7:0]) input from the external and set in the counter voltage register 102, and data (AMP [3:0]) input from the external and set in the scanning voltage pulse width setting register 101 are arithmetically calculated by an arithmetic logic circuit 103, and data (SCAN [3:0]) output from the arithmetic logic circuit 103 is set in a scanning voltage setting register 104, and the electron variable resistor circuit (DBR2) is controlled on the basis of the value set in the scanning voltage setting register 104 to generate the touch panel scanning voltage (Vstc).

In this embodiment, as illustrated in FIG. 19C, the touch panel scanning voltage (Vstc) can be adjusted, for example, on a 0.2V basis on the basis of the value set in the scanning voltage setting register 104.

Also, as illustrated in FIG. 19B, the touch panel scanning voltage amplitude value (AMP in FIG. 16) can be adjusted, for example, on the 0.2V basis on the basis of the value set in the scanning voltage pulse width setting register 101.

Further, as illustrated in FIG. 19A, the touch panel scanning voltage (Vstc) can be adjusted, for example, on the 0.2V basis on the basis of the value set in the scanning voltage setting register 104.

In this embodiment, since the system using the analog circuit illustrated in FIG. 17 is replaced with the digital circuit, the circuit area can be reduced.

As illustrated in FIG. 19C, when the touch panel scanning voltage amplitude value (AMP in FIG. 16) is set to 6V by the scanning voltage pulse width setting register 101, the liquid crystal display panel having the counter voltage (Vcom) of 0V to 1V selects 5V as the touch panel scanning voltage (Vstc), and the liquid crystal display panel having the counter voltage (Vcom) of −1.025V to −1.2V selects 4.8V as the touch panel scanning voltage (Vstc).

In this way, the touch panel scanning voltage (Vstc) having a given amplitude value can be obtained with respect to the counter voltage (Vcom) different in each of the liquid crystal display panels.

In this way, in this embodiment, the liquid crystal driver IC (DRV) has a function of generating the touch panel scanning voltage (Vstc) higher than the counter voltage (Vcom) by the touch panel scanning voltage amplitude value, and outputting the touch panel scanning voltage (Vstc).

Because the amplitude value of the touch panel scanning voltage (Vstc) for each of the liquid crystal display panels can be held constant with respect to the counter voltage (Vcom) different in each of the liquid crystal display panels, the detection sensitivity of touch in each of the liquid crystal display panels can be equalized. Further, because the amplitude of the touch panel scanning voltage (Vstc) can be also set to be smaller, the power consumption can be also reduced.

In addition, when the above function is implemented by the logic circuit within the liquid crystal driver IC (DRV), the circuit area is reduced more than that when the function is implemented by the analog circuit, and the cost can be reduced by a reduction in the chip size.

The invention made by the present inventors has been described above in detail on the basis of the embodiment. The present invention is not limited to the above embodiment, and can be variously changed without departing from the spirit of the present invention.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A liquid crystal display device including a liquid crystal display panel, the liquid crystal display panel comprising:

a plurality of pixel electrodes arranged in a matrix;

a plurality of video signal lines, each being supplied with a video signal in a video signal applying cycle;

a counter electrode divided into a plurality of blocks;

a counter electrode selector circuit supplying a counter voltage and a touch panel scanning voltage to the counter electrode of the respective divided blocks;

a counter voltage supplying line connected to the counter electrode selector circuit and supplying the counter voltage; and a touch panel scanning voltage supplying line connected to the counter electrode selector circuit and supplying the touch panel scanning voltage, wherein the counter electrode selector circuit includes a selector circuit which connects the touch panel scanning voltage supplying line and the counter electrode in a touch detection period, and the counter voltage supplying line and the counter electrode in a pixel write period, the touch panel scanning voltage is applied to one block of the counter electrode a plurality of times in the touch detection period, a length of the touch detection period includes the video signal applying cycle and is longer than the video signal applying cycle, and an output of the touch panel scanning voltage is synchronized with the video signal applying cycle in the touch detection period.

2. The liquid crystal display device according to claim 1, wherein the selector circuit includes a first switch and a second switch, the first switch is on state in the touch detection period and connects between the touch panel scanning voltage supplying line and the counter electrode, and the second switch is on state in the pixel write period and connects between the counter voltage supplying line and the counter electrode in the pixel write period.

3. The liquid crystal display device according to claim 2, wherein the counter electrode selector circuit includes an address decoder circuit, and the address decoder circuit outputs a select signal which turns on the first switch in the touch detection period.

4. The liquid crystal display device according to claim 3, wherein the liquid crystal display panel includes a plurality of address signal lines which connect to the address decoder circuit, and the address decoder circuit outputs the select signal which is decoded by a combination of signals of the plurality of address signal lines.

5. The liquid crystal display device according to claim 4, wherein number of the plurality of address signal lines is less than that of the divided blocks.

6. The liquid crystal display device according to claim 4, wherein the address decoder circuit receives a signal of the plurality of address signal line or an inverted signal of the plurality of address signal line.

7. A liquid crystal display device comprising:

a liquid crystal display panel including a substrate;

a plurality of pixel electrodes formed on the substrate and arranged in a matrix;

a plurality of video signal lines, each being supplied with a video signal in a video signal applying cycle;

a counter electrode divided into a plurality of blocks and opposed to the plurality of pixel electrodes commonly;

a counter electrode selector circuit supplying a counter voltage and a touch panel scanning voltage to the counter electrode of the respective divided blocks and formed on the substrate;

a counter voltage supplying line connected to the counter electrode selector circuit and supplying the counter voltage; and a touch panel scanning voltage supplying line connected to the counter electrode selector circuit and supplying the touch panel scanning voltage, wherein the counter electrode selector circuit includes a selector circuit which connects the touch panel scanning voltage supplying line and the counter electrode in a touch detection period, and the counter voltage supplying line and the counter electrode in a pixel write period, the touch panel scanning voltage is applied to one block of the counter electrode a plurality of times in the touch detection period, the touch detection period includes plural consecutive video signal applying cycles, and an output of the touch panel scanning voltage is synchronized with the video signal applying cycle of the touch detection period.

8. The liquid crystal display device according to claim 7, wherein the selector circuit includes a first switch and a second switch, the first switch is on state in the touch detection period and connects between the touch panel scanning voltage supplying line and the counter electrode, and the second switch is on state in the pixel write period and connects between the counter voltage supplying line and the counter electrode in the pixel write period.

9. The liquid crystal display device according to claim 8, wherein the counter electrode selector circuit includes an address decoder circuit, and the address decoder circuit outputs a select signal which turns on the first switch in the touch detection period.

10. The liquid crystal display device according to claim 9, wherein the liquid crystal display panel includes a plurality of address signal lines which connect to the address decoder circuit, and the address decoder circuit outputs the select signal which is decoded by a combination of signals of the plurality of address signal lines.

11. The liquid crystal display device according to claim 10, wherein number of the plurality of address signal lines is less than that of the divided blocks.

12. The liquid crystal display device according to claim 10, wherein the address decoder circuit receives a signal of the plurality of address signal line or an inverted signal of the plurality of address signal line.

* * * * *